United States Patent [19]

Ngo et al.

[11] Patent Number: 5,793,551
[45] Date of Patent: Aug. 11, 1998

[54] AMPLIFIER HAVING A DIFFERENTIAL INPUT CAPACITANCE CANCELLATION CIRCUIT

[75] Inventors: Tuan V. Ngo, Eden Prairie; Raymond E. Barnett, Burnsville; Craig M. Brannon, Maplewood, all of Minn.

[73] Assignee: VTC Inc., Bloomington, Minn.

[21] Appl. No.: 477,291

[22] Filed: Jun. 7, 1995

[51] Int. Cl.⁶ .................................. G11B 5/02; G11B 5/09
[52] U.S. Cl. .................. 360/67; 360/46; 327/65; 327/67
[58] Field of Search ............................... 360/65, 66, 67, 360/68, 46; 327/52, 54, 65, 66, 67

[56] References Cited

U.S. PATENT DOCUMENTS

| | | | |
|---|---|---|---|
| 4,926,271 | 5/1990 | Aoki et al. | 360/62 |
| 4,956,729 | 9/1990 | Yatsugi et al. | 360/67 |
| 5,345,346 | 9/1994 | Brannon et al. | 360/67 |
| 5,539,342 | 7/1996 | Gersbach et al. | 360/67 |

OTHER PUBLICATIONS

*Analysis and Design of Analog Integrated Circuits*, "Frequency Response of Integrated Circuits", pp. 381–428, Paul R. Gray and Robert G. Meyer, 1977.

Primary Examiner—Aristotelis M. Psitos
Assistant Examiner—Regina Y. Neal
Attorney, Agent, or Firm—Kinney & Lange, P.A.

[57] ABSTRACT

A first differential amplifier circuit is provided having a first and second input terminal suited for connection to a magnetic head. The first differential amplifier circuit includes first and second output terminals for providing a read output signal. A second differential amplifier circuit is provided which has first and second input terminals connected to the first and second input terminals, respectively, the first differential amplifier circuit. The second differential amplifier circuit also includes first and second output terminals. A first feedback capacitor is provided which is connected between the first input terminal of the first differential amplifier circuit and the first output terminal of the second differential amplifier circuit. A second feedback capacitor is provided which is connected between the second input terminal of the first differential amplifier circuit and the second output terminal of the second differential amplifier circuit.

13 Claims, 4 Drawing Sheets

AMPLIFIER HAVING A DIFFERENTIAL INPUT CAPACITANCE CANCELLATION CIRCUIT

BACKGROUND OF THE INVENTION

The present invention relates to magnetic storage devices which utilize a magnetic head and a read amplifier for retrieving information stored on a magnetic medium. More particularly, the present invention relates to a differential read amplifier system which includes a differential read amplifier circuit and a capacitance cancellation circuit for reducing the effective input capacitance of the differential read amplifier for improving frequency response of the differential read amplifier.

Magnetic storage systems store information by magnetizing adjacent bit positions on a recording surface of magnetic medium, such as a magnetic disc in a magnetic disc drive. Within the magnetic disc drive, an actuator arm supports a magnetic head close to the recording surface for reading and writing information to the magnetic medium.

The magnetic head includes an inductive coil which is used in conjunction with write and read circuitry for writing and reading information to and from the magnetic medium, respectively, by creating a changing magnetic field or sensing changes in magnetic fields. For example, in write mode, the magnetic head writes information by forcing a relatively large current through the inductive coil in a selected direction to polarize a bit position adjacent the magnetic head in a selected direction. By controlling the direction at which the adjacent bit positions are polarized, digital information can be written onto the disc surface.

In read mode, the magnetic head senses changes in polarization of adjacent bit positions. The changes in polarization induce a current in the magnetic head in a direction indicative of the direction in which the adjacent bit positions are polarized. The direction of the induced current is, therefore, representative of the data stored on the magnetic medium.

During read mode, the read circuitry monitors the direction of current flow induced in the magnetic head at a pair of head terminals. The read circuitry sometimes includes a differential read amplifier having a pair of input terminals which are connected to the pair of magnetic head terminals by a pair of lead conductors. One type of differential read amplifier that is sometimes used makes use of a read differential transistor pair that is connected across the pair of head terminals.

The magnetic head often has an inductive output impedance L that is in series with the read circuitry. This output impedance, L, represents an equivalent inductance of the coil and/or inductance of the leads connecting the magnetic head to the read circuitry.

In addition, the read circuitry sometimes has a capacitive input impedance. For example, as discussed previously, a differential transistor pair is sometimes connected between the pair of head terminals. For this configuration, capacitances associated with the base-emitter and base-collector junctions of the differential transistor pair produce a differential capacitive component to the input impedance of the read circuitry.

The resonant frequency for a configuration that includes a read amplifier having a capacitive input impedance and a magnetic head having an inductive output impedance is defined by the following equation:

$$f_o = \frac{1}{2\pi\sqrt{LC}} \quad \text{EQUATION 1}$$

where $f_o$ represents the resonant frequency, L represents an equivalent inductive impedance of the magnetic head and leads connecting the head to the read circuitry, and C is an equivalent capacitance in parallel with the magnetic head due to the input capacitance of the read circuitry as well as stray capacitance. Signals that are greater than the resonant frequency tend to be attenuated thereby producing a low pass filtering effect at the input terminals of the read circuitry. This low pass filtering affect tends to reduce the bandwidth of the preamplifier. Disc storage devices that have high data rates between the magnetic head and read circuitry require signals having fast transition times. The signals that have fast transition times have more high frequency components and therefore require greater bandwidths. Therefore, it is necessary that any low pass filtering effects be minimized or eliminated to improve the preamplifier bandwidth so that the data rates can be maximized.

In read preamplifier design, tradeoffs must usually be made between low input voltage noise and low input capacitance. It is difficult to design a read preamplifier with both low input voltage noise and low input capacitance. Low intrinsic base resistance of the input transistor pair is desirable because as the base resistance of the input device decreases, input noise levels also decrease. Decreasing the input noise improves the signal-to-noise ratio of the preamplifier and results in increase sensitivity which allows the read preamplifier to read data from magnetic storage media with increased data bit densities.

In the alternative, low input capacitance is desirable because, as input capacitance increases, the bandwidth of the system in read mode decreases. As a result, high input capacitance reduces the useful bandwidth of the system in read mode. Low bandwidths limit the maximum rate at which data can be read from the surface of the magnetic media. Currently, read preamplifier designers must choose between a high signal-to-noise ratio and a high read data rate.

SUMMARY OF THE INVENTION

The present invention is a differential read amplifier system configured for connection to a magnetic head. The differential read amplifier system includes a first differential amplifier circuit having first and second input terminals suited for connection to the magnetic head. The first differential amplifier circuit also includes first and second output terminals for providing a read output signal. A capacitance cancellation circuit connected between the first and second input terminals for providing a cancellation current to the first and second input terminals for reducing an effective input capacitance of the first differential amplifier circuit.

In one preferred embodiment, the capacitance cancellation circuit includes a second differential amplifier circuit having first and second input terminals connected to the first and second input terminals, respectively, of the first differential amplifier and first and second output terminals. Also included in the differential read amplifier system is a first feedback capacitor connected between the first input terminal of the first differential amplifier circuit and the first output terminal of the second differential amplifier circuit. A second feedback capacitor is also provided between the second input terminal of the first differential amplifier circuit and the second output terminal of the second differential amplifier circuit.

In one preferred embodiment, the first and second input terminals of the first amplifier circuit have the same phase relationship as each of the first and second input terminals, respectively, of the second amplifier circuit and the first and second output terminals, respectively, of the second amplifier circuit.

In another preferred embodiment, the differential read amplifier system of the present invention includes a first differential amplifier circuit having first and second input terminals suited for connection to the magnetic head and first and second output terminals providing a read output signal therebetween, the first differential amplifier circuit having an input capacitance associated with the first and second input terminals.

DETAILED DESCRIPTION OF THE PREFERRED EMBODIMENTS

The present invention is an apparatus and method for reducing an effective input capacitance of a read differential amplifier through the use of a capacitance cancellation amplifier. This reduction of the effective input capacitance of the read differential amplifier allows the use of larger, lower noise transistors in the differential transistor pair without reducing the bandwidth of the amplifier.

Figure 1:
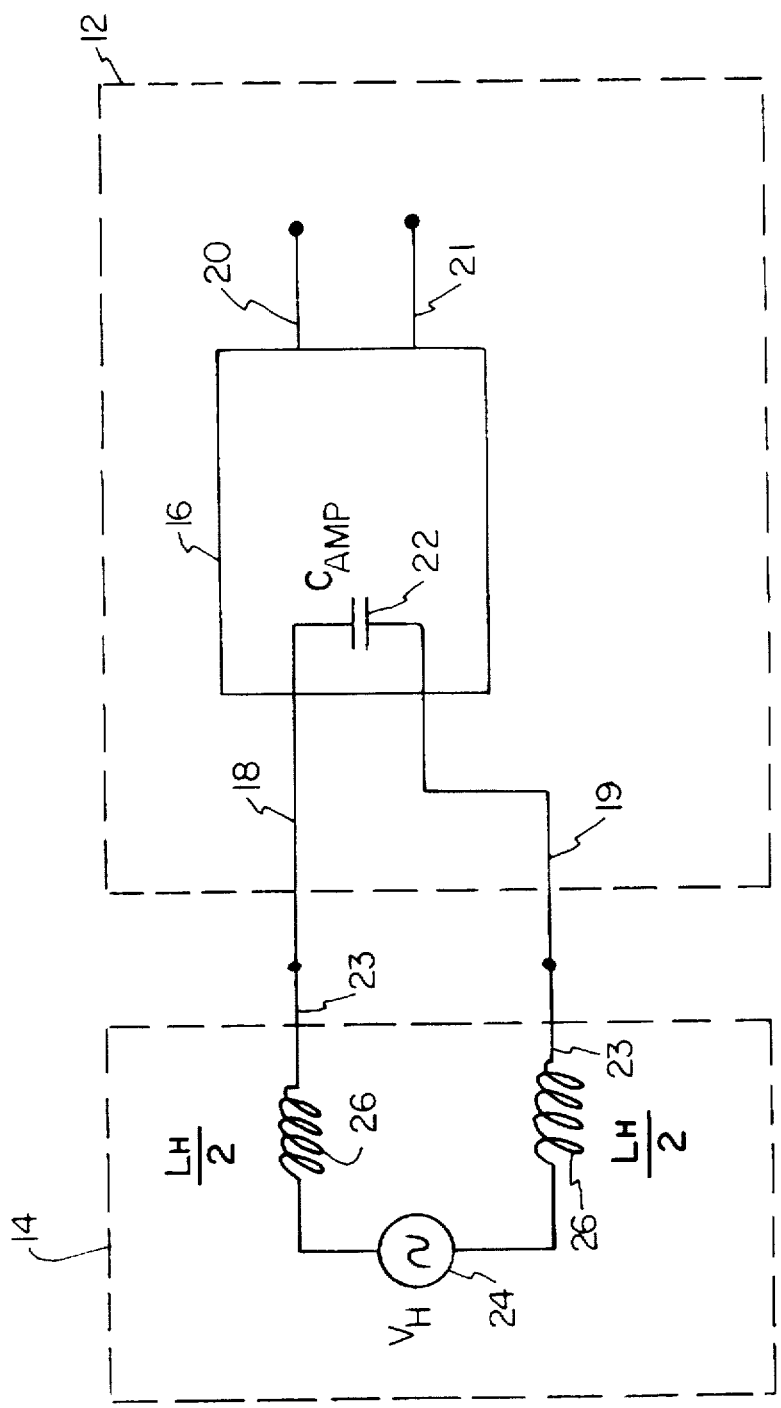
FIG. 1 is a schematic representation of a prior art read differential amplifier connected to a magnetic head.

Before discussing the technique of the present invention, it will be helpful to first discuss a prior art read differential amplifier 12 for use with a magnetic head 14 as shown in FIG. 1. The differential amplifier system 12 includes a differential amplifier 16 having a pair of input terminals 18 and 19 and a pair of output terminals 20 and 21. The differential amplifier 16 receives a difference signal at input terminals 18 and 19 and provides an amplified difference signal at output terminals 20 and 21.

The differential amplifier 16 has an input capacitance $C_{AMP}$ represented by capacitor 22. This input capacitance $C_{AMP}$ represents a differential input capacitance of the differential amplifier 16. The differential input capacitance $C_{AMP}$ represents the equivalent capacitive input impedance of the differential amplifier 16 which amplifies the differential input signal applied at input terminals 18 and 19.

For the case where the differential amplifier 16 is a common emitter differential amplifier, the input capacitance $C_{AMP}$ represents the combined base-emitter capacitances as well as base-collector capacitances for each of the transistors which form the differential transistor pair. The input capacitance of a common emitter differential amplifier is discussed in more detail in U.S. Pat. No. 5,345,346 to Brannon et al., assigned to the assignee of the present invention, incorporated by reference herein.

The magnetic head 14 includes a pair of output terminals 23 for providing an output signal indicative of information stored on the magnetic media. The magnetic head 14 can be modeled by a voltage source 24 providing a voltage $V_H$ and a pair of inductors 26 in series with the voltage source 24 and each having an inductance $L_H/2$. The voltage source 24 produces a head voltage $V_H$ that is equal to an induced voltage due to changes in magnetic flux orientations as the magnetic media is moved past the magnetic head 14. The inductors 26 represent the differential inductance of the magnetic head 14 together with any inductance of leads used to connect the magnetic head 14 to the differential amplifier 16.

The differential amplifier 16 sometimes has relatively high input capacitance 22. For example, the differential amplifier 16 is a common emitter differential amplifier having a differential transistor pair with the base terminals of the differential transistor pair connected between the input terminals 18 and 19. The equivalent input capacitance $C_{AMP}$ results from the equivalent capacitance of the series combination of emitter base capacitances for each of the transistors in the differential transistor pair. Because electrical noise in bipolar transistors tends to be inversely related to the transistor size or emitter base junction area the emitter base junction area for each of the differential transistors are relatively large. Hence, electrical noise is minimized. The input capacitance $C_{AMP}$ of the differential amplifier, in contrast, is directly related to the size of the emitter base junction. This input capacitance 22 together with the head inductance 26 produce a low pass filtering effect at the input terminals 18 and 19 of the differential amplifier 16. This low pass filtering effect tends to attenuate high frequency signals from the differential amplifier 16 input terminals 18 and 19 thereby reducing the bandwidth of the amplifier. In general, the cutoff frequency for the lowpass filtering decreases with an increase in either the capacitance of input capacitor 22 or the inductance of inductors 26.

Reduction of the cutoff frequency tends to increase the low pass filtering affect or reduce the bandwidth of the differential amplifier 16. Therefore, there is usually a design tradeoff that must be made between electrical noise of the differential transistor pair and bandwidth of the differential amplifier 16. Reducing the electrical noise of the differential transistor pair tends to increase the bandwidth of the differential amplifier 16.

Figure 2:
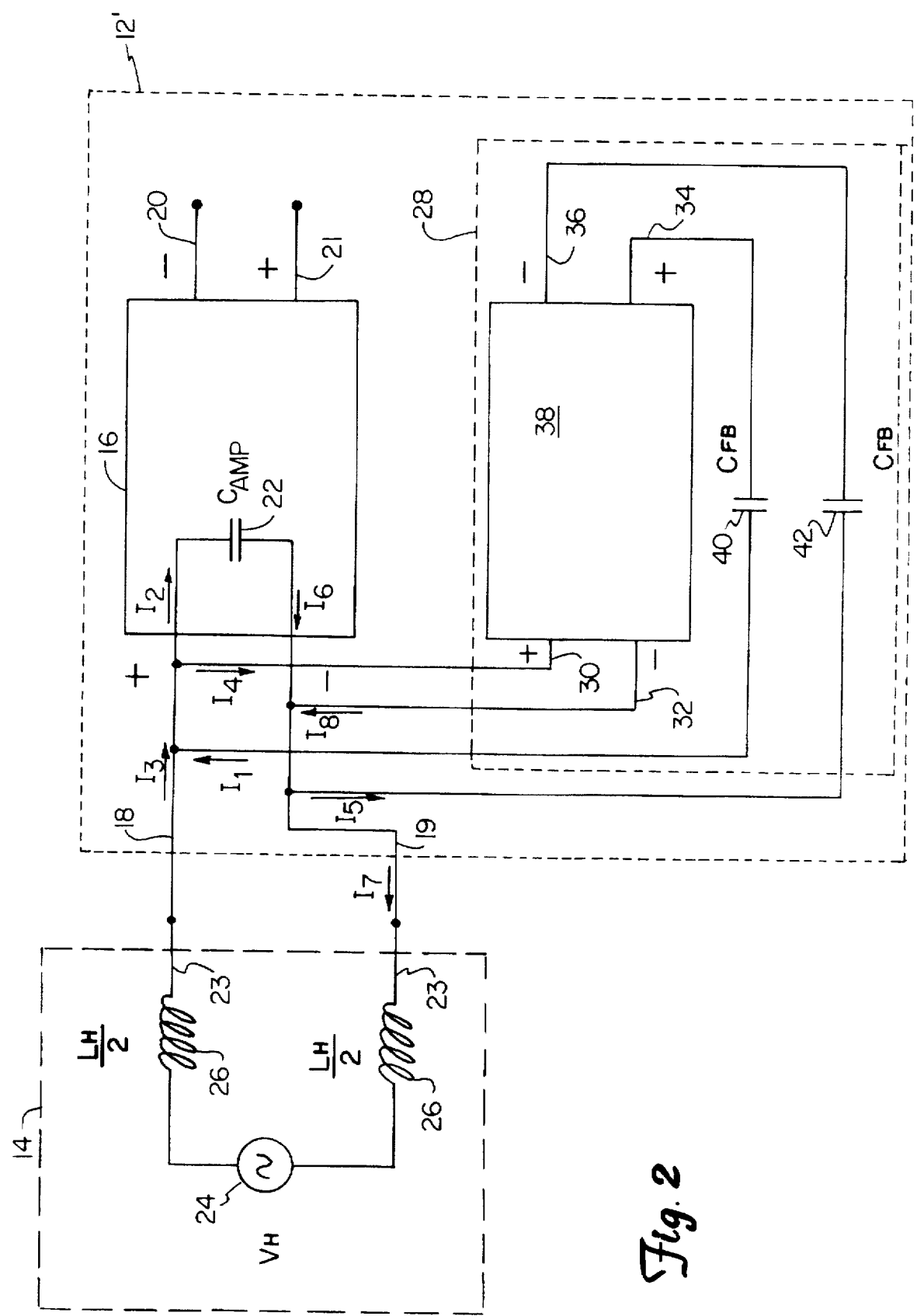
FIG. 2 is a schematic representation of a differential read amplifier system of the present invention connected to a magnetic head.

FIG. 2 shows the differential amplifier system 12' of the present invention connected to a magnetic head 14. Similar numbering is used in FIG. 2 to identify structures in FIG. 1 that are similar. The differential amplifier system 12' has a pair of input terminals 18 and 19 for receiving a difference signal from the magnetic head 14 and a pair of output terminals 20 and 21 for providing an amplified difference signal. Also included in the differential amplifier system 12' is a capacitance cancellation circuit 28 which has a pair of input terminals 30 and 32 connected to the pair of input terminals 18 and 19 of the differential amplifier 16 and a pair of output terminals 34 and 36 connected respectively to the pair of input terminals 18 and 19 of the differential amplifier 16. The capacitance cancellation circuit 28 has the effect of reducing the input capacitance 22 labeled $C_{AMP}$, for the differential amplifier 16. This effective reduction of $C_{AMP}$ is accomplished by the reduction of the effective differential input capacitance between input terminals 18 and 19 of the differential amplifier system 12'. This reduction of the effective input capacitance of the differential amplifier system 12' effectively increases the corner frequency and bandwidth of the differential amplifier 16 for a given emitter base junction sized differential transistor pair. Reduction of the low pass filtering effect which increased the bandwidth of the differential amplifier 16 thereby allows the differential amplifier 16 to accommodate greater data rates.

The cancellation of the input capacitance $C_{AMP}$ for the differential amplifier 16 to reduce the input capacitance for the entire differential amplifier system 12' is accomplished by the capacitance cancellation circuit 28 which provides a current $I_1$ that is approximately equal to and in phase with an input current $I_2$ which is provided to the differential amplifier 16. Because the differential amplifier 38 is selected to have a low input capacitance, the current $I_4$ into input terminal 30 is negligible. Since $I_4$ is negligible or zero and $I_1$ is equal to $I_2$, then a current $I_3$ provided by the magnetic head 14 at input terminal 18 is negligible or zero. Therefore, if the input current $I_3$ to the differential amplifier system 12', is zero or negligible, then the differential amplifier system 12' has a zero or negligible input capacitance at the input terminals 18 and 19.

In a similar manner, the capacitance cancellation circuit 28 sinks a current $I_5$ that is in phase and approximately equal to an input current $I_6$ which is provided by the differential amplifier 16. Because the differential amplifier 38 is selected to have a low input capacitance, the current $I_8$ provided by input terminal 32 is negligible. Since $I_8$ is negligible and $I_5$ is equal to $I_6$, then a current $I_7$ that is provided by the differential amplifier system 12' is negligible. By providing this equal and in phase current to each of the input terminals 18 and 19 little or no current is drawn by the differential amplifier system 12' for a changing voltage at input terminals 18 and 19, therefore canceling the effective input capacitance of the differential amplifier system 12'.

The capacitance cancellation circuit 28 includes a differential amplifier 38 and a pair of feedback capacitors 40 and 42. The differential amplifier 38 has a pair of input terminals 30 and 32 connected to the input terminals 18 and 19, respectively, of the differential amplifier 16. The output terminals 34 and 36 of differential amplifier 38 are connected to the input terminals 18 and 19, of the differential amplifier 16 through a pair of feedback capacitors 40 and 42, respectively. The differential amplifier 38 is shown connected in an in phase relationship with the input terminals 18 and 19 of the differential amplifier 16. Therefore, as input terminal 18 becomes more positive with respect to input terminal 19, the input terminal 30 becomes more positive with respect to input terminal 32 and the amplified output of differential amplifier 38 at terminal 34 becomes more positive with respect to terminal 36. Similarly, when input terminal 18 becomes more negative with respect to input terminal 19, the output terminal 34 of differential amplifier 38 will become more negative with respect to output terminal 36.

The magnetic head 14 shown in FIG. 2 is similar to the magnetic head 14 shown in FIG. 1. The magnetic head 14 as shown in FIG. 2 is modeled as a voltage source 24, a pair of inductances 26 labeled $L_H/2$ and a pair of output terminals 23. The voltage source 14 provides a signal at output terminals 23 that is indicative of information stored on a magnetic media.

Because the differential amplifier 38 has an input capacitance that is very small relative to the input capacitance $C_{AMP}$ of the differential amplifier 16 then the input capacitance for the entire differential amplifier system 12' can be represented as follows:

$$C_{IN} = C_{AMP} + (1 - A_{VFB})\frac{C_{FB}}{2} \qquad \text{EQUATION 2}$$

where $C_{AMP}$ is equal to the input capacitance of the differential amplifier 16, $A_{VFB}$ represents the gain of differential amplifier 38 and $C_{FB}/2$ represents the series combination of capacitor 40 and 42 each having differential capacitance values represented by $C_{FB}$. Setting $C_{IN}$ equal to zero in equation 2 and solving for $A_{VFB}$ yields the following equation:

$$A_{VFB} = 1 + \frac{2 C_{AMP}}{C_{FB}} \qquad \text{EQUATION 3}$$

Equation 3 illustrates that the proper selection of the gain of differential amplifier 38 results in the cancellation or nulling of the input capacitance for the differential amplifier system 12'. In the preferred embodiment, the gain of the differential amplifier 16 is much larger than the gain of differential amplifier 38.

Figure 3:
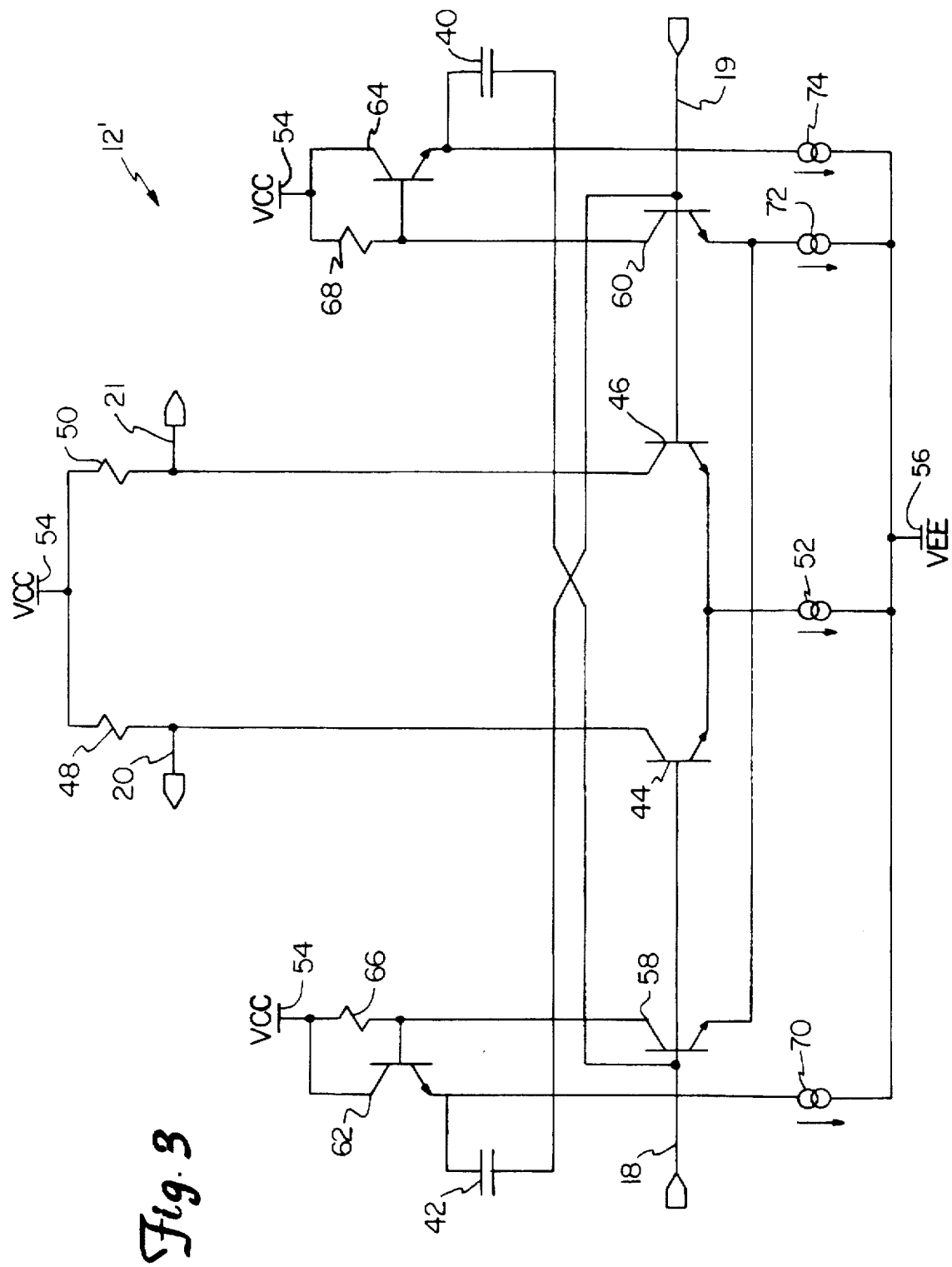
FIG. 3 is a circuit diagram of one preferred embodiment of the differential read amplifier system of the present invention.

FIG. 3 shows a schematic diagram of a preferred embodiment of the differential amplifier system 12' shown in FIG. 2. The differential amplifier system 12' includes a pair of input terminals 18 and 19 for receiving a difference signal from the magnetic head 14 shown in FIG. 2 and a pair of output terminals 20 and 21 for providing an amplified difference signal.

The differential amplifier system 12' includes a differential amplifier which includes a differential transistor pair 44, 46, resistors 48 and 50, and a current source 52. A constant polarity supply voltage is supplied across supply terminals 54 and 56.

Also included in the differential amplifier system 12' is the capacitance cancellation circuit 28 shown in FIG. 2 including feedback capacitors 40 and 42 and common emitter differential amplifier circuit 38, also shown in FIG. 2. The common emitter differential amplifier circuit 38 includes a common emitter differential transistor pair 58 and 60, transistors 62 and 64, resistors 66 and 68, and constant current sources 70, 72 and 74.

The differential amplifier formed from the differential transistor pair 44 and 46 is connected to input terminals 18 and 19, respectively, of the differential amplifier system. Resistors 48 and 50 are connected between the collectors of the differential transistor pair 44 and 46, respectively and the supply terminal 54. Current source 52 is connected between emitter terminals of the differential transistor pair, 44 and 46, and the supply terminal 56.

In operation, as input terminal 18 of the differential amplifier becomes more positive relative to input terminal 19, the base of transistor 44 becomes more positive relative to the emitter of transistor 44 thereby increasing the collector current in transistor 44. As the collector current of transistor 44 increases a voltage drop across resistor 48 increases thereby reducing a voltage at output terminal 20.

Conversely, as input terminal 19 becomes more negative relative to input terminal 18, a base emitter voltage of transistor 46 is reduced thereby reducing a collector current in transistor 46. This reduction in the collector current of transistor 46 reduces a voltage drop across resistor 50 thereby increasing a voltage at output terminal 21. Therefore, the differential amplifier formed by the differential transistor pair 44 and 46 provides an output voltage across output terminals 20 and 21 that is equal to a difference voltage at input terminals 18 and 19, respectively adjusted by the gain of the differential amplifier.

The input impedance for the differential amplifier formed from transistors 44 and 46 includes a base charging capacitance $C_b$, base-emitter junction capacitance $C_{je}$ and collector-base capacitance $C_\mu$. In addition, a Miller-effect capacitance results from the voltage gain of the amplifier circuit. The Miller-effect capacitance is discussed in greater detail in Chapter 7 of "Analysis and Design of Analog Integrated Circuits" by Paul R. Gray and Robert G. Meyer, published by John Wiley & Sons, Inc., 1977. This Miller-effect capacitance $C_M$ is given by the following equation:

$$C_M = (1+A_V)C_\mu \qquad \text{EQUATION 4}$$

where $A_V$ is the differential gain of the differential amplifier and $C_\mu$ is the collector-base capacitance. From equation 4, the Miller-effect capacitance increases with the gain of the differential amplifier.

The capacitance cancellation circuit 38 shown in FIG. 2 includes differential transistor pairs 58 and 60, resistors 66 and 68, transistors 62 and 64, feedback capacitors 40 and 42 and current sources 70, 72 and 74 as shown in FIG. 3.

The differential amplifier within the capacitance cancellation circuit formed from transistors 58 and 60 have a pair of input terminals that are connected to the input terminals 18 and 19, respectively, of the differential amplifier system 12' shown in FIGS. 2 and 3. The differential amplifier formed from differential transistors 58 and 60 correspond to the differential amplifier 38 shown in FIG. 2. This differential amplifier is similar to the differential amplifier formed by transistors 44 and 46 except that instead of providing an output at output terminals 20 and 21 corresponding output voltages at the bases of transistors 62 and 64 are fed back respectively through feedback capacitors 42 and 40 to input terminals 19 and 18.

Thus, if the input terminal 18 becomes more positive with respect to input terminal 19 the base to emitter voltage of transistor 58 increases and a collector current in transistor 58 increases thereby increasing the voltage drop across resistor 66. This increased voltage drop across resistor 66 reduces the voltage at the base of transistor 62 thereby reducing the voltage at the emitter of transistor 62 as well as across capacitor 42. This change in voltage across capacitor 42 causes a current to pass from the input terminal 19 to capacitor 42. This current is designated as $I_5$ in FIG. 2 and is ideally equal to current $I_6$ provided by capacitor 22 in the differential amplifier 16 shown in FIG. 2.

Similarly, as input terminal 19 becomes more negative with respect to input terminal 18 of the base to emitter voltage of transistor 60 increases thereby reducing the collector current in transistor 60. This reduction in collector current reduces the voltage drop across resistor 68 thereby increasing a base voltage on transistor 64. Increasing the base emitter voltage on transistor 64 produces an emitter current by transistor 64 which raises the voltage on capacitor 40 producing a current passing from capacitor 40 to the input terminal 18. This changing voltage across capacitor 40 produces the current designated at $I_1$ in FIG. 2 which is ideally equal to current $I_2$ passing between the input terminal 18 and the differential amplifier 16.

The difference voltage at input terminals 18 and 19 varies from positive to negative causing the input capacitance 22 of the differential amplifier 16 to both source and sink current at each of input terminals 18 and 19. In response to the sourcing and sinking of current by the differential amplifier 16 at these input terminals 18 and 19, the capacitance cancellation circuit sources and sinks substantially the same current at input terminals 18 and 19, in phase with the differential amplifier 16 so that the magnetic head 14 which is external to the differential amplifier system 12' is not affected by this sourcing and sinking of current. As a result, the effect of the input capacitance 22 of differential amplifier 16 is canceled as well as the cancellation of negative frequency response effects of this capacitance.

Figure 4:
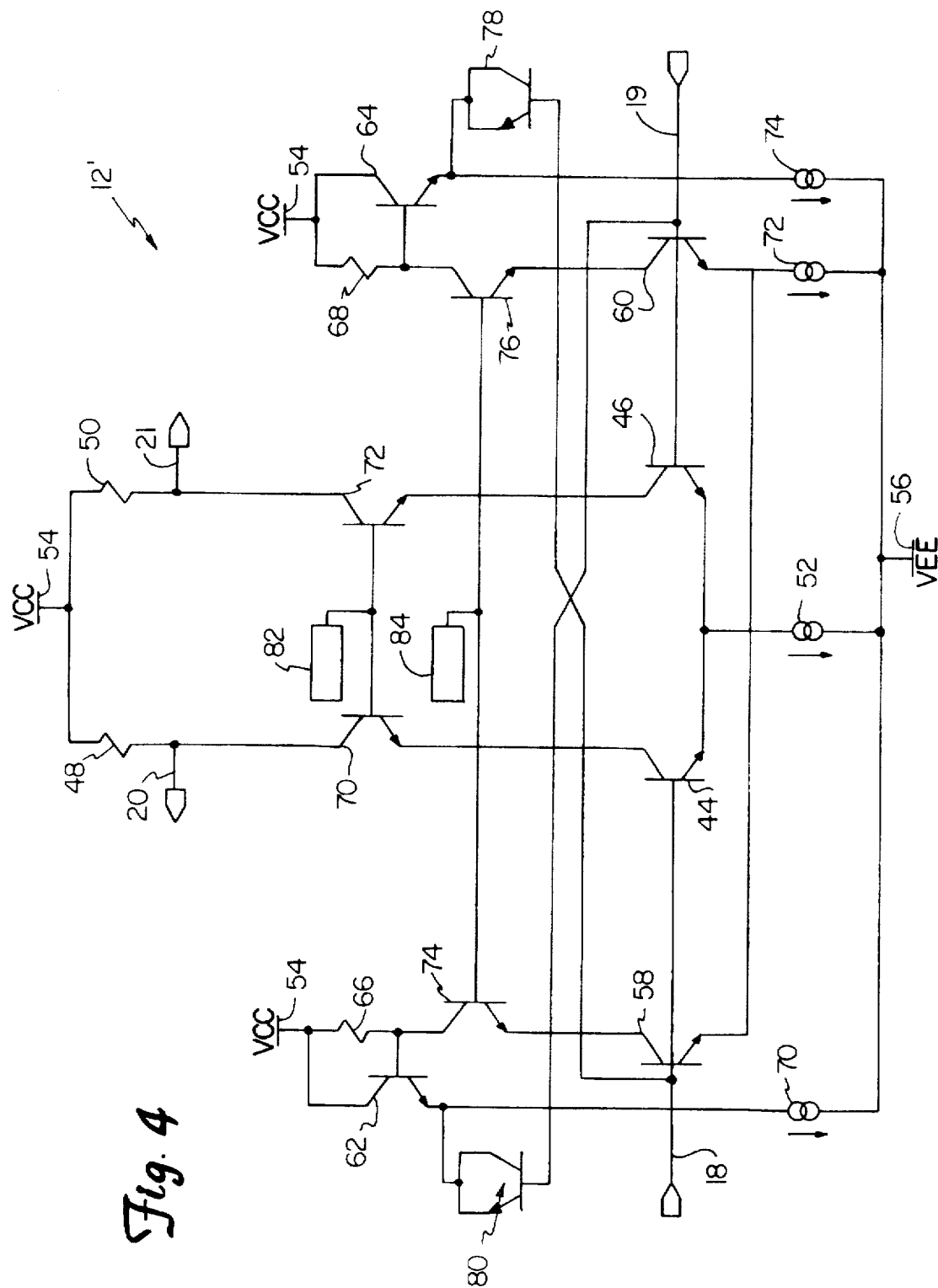
FIG. 4 is a schematic diagram of an alternate embodiment of the differential read amplifier system shown in FIG. 2.

FIG. 4 is one preferred embodiment of the differential amplifier system 12' shown in FIG. 2. FIG. 4 is similar to the embodiment shown in FIG. 3 except for the addition of cascode connected transistors 70 and 72 for the differential transistor pair 44 and 46 which corresponds to the differential amplifier 16 shown in FIG. 2. In addition, cascode connected transistors 74 and 76 are connected in a similar manner to differential transistor pair 58 and 60 which corresponds to the differential amplifier 38 shown in FIG. 2. In addition, the feedback capacitors 40 and 42 shown in FIG. 3 are replaced by transistor connected capacitors 78 and 80, respectively, thereby allowing the capacitance values of transistors 78 and 80 to track the capacitance values of transistors 44 and 46 of the differential transistor pair.

The cascode connected transistors 70, 72, 74 and 76 reduce the Miller-effect input capacitance for the corresponding transistors 44, 46, 58 and 60, respectively, of the common emitter differential pair amplifiers, 16 and 38 shown in FIG. 2. The use of cascode configurations for reducing Miller-effect is discussed generally in Chapter 7 of "Analysis and Design of Analog Integrated Circuits" by Gray and Meyer. The use of cascode connected transistors 70 and 72 reduces the Miller-effect capacitance of transistors 44 and 46 thereby reducing the input capacitance 22 of the differential amplifier 16. Reducing the Miller-effect capacitance component of the input capacitance for the differential amplifier 16 improves the ability for the capacitance cancellation circuit 28 to cancel the input capacitance of the differential amplifier 16 in several ways. First, reducing the input capacitance of the differential amplifier 16 reduces the magnitude of the capacitance cancellation required by the capacitance cancellation circuit 38. By reducing the magnitude of the cancellation required the cancellation error is reduced for a given percentage error in the cancellation technique. For example, for a given percentage of error in capacitance cancellation, the resulting input capacitance or cancellation error for the differential amplifier system 12' will be greater for a differential amplifier 16 having a larger input capacitance 22 than for a differential amplifier 16 having a smaller input capacitance 22. Secondly, the frequency response of both the differential amplifier 16 and the differential amplifier 38 are improved by the reduction of the Miller-effect capacitance component of the input capacitance for each of these amplifiers. This improvement in frequency response improves the response time of both of these amplifiers.

The capacitor connected transistors 78 and 80 each have a collector and emitter terminals that are connected together to form a capacitor between the base terminal and each of the emitter and collector terminals. The transistor connected capacitors 78 and 80 are connected between output terminals of differential amplifier 38 and input terminals 18 and 19, respectively, of the differential amplifier system 12' shown in FIG. 2. The use of capacitor connected transistors 78 and 80 in place of capacitors 40 and 42, respectively, provides better tracking of the input capacitance 22 of the differential amplifier 16 over varying environmental conditions such as temperature and process variations that are used to form these structures. Because the capacitor connected transistors 78 and 80 used as feedback capacitors are formed from similar structures to the structures of differential transistors 44 and 46 and the capacitance of these capacitor connected transistors 78 and 80 will track the capacitance values of the differential transistor pair 44 and 46, respectively, over changes in environmental conditions and process variations, among others. The use of capacitor connected transistors 78 and 80 in place of feedback capacitors 40 and 42 allows the capacitance cancellation circuit to compensate for variations in the differential amplifier input capacitance 22 thereby more accurately reducing the input capacitance of the differential amplifier system 12'. In the preferred embodiment, the differential amplifier system 12' is formed on a single semi-conductor substrate and capacitor connected transistors 78 and 80 have the same temperature coefficients as differential pair transistors 44 and 46.

Bias sources 82 and 84 shown in FIG. 4 are provided for supplying a bias current to the cascode configured transistors 70, 72, 74 and 76. The bias sources 82 and 84 are conventional bias current sources for providing bias voltage to transistors 70, 72, 74 and 76.

Electrical noise in a bipolar differential amplifier is inversely related to the area of the emitter-base junction. Therefore, from a noise standpoint it is desirable to use larger transistors, i.e. transistors that have large emitter-base junction areas. As discussed previously, the input capacitance of a transistor tends to be directly related to the size of the transistor. Therefore, larger, less noisy transistors tend to have greater input capacitance. The capacitance cancellation circuit 28 of the present invention tends to reduce or cancel the effective input capacitance, thereby allowing the use of larger, lower noise transistors without the ill effects of reduced bandwidth due to the high input capacitance.

As discussed previously, the differential amplifier 16 makes use of larger, lower noise transistors in the differential transistor pair 44 and 46 because this capacitance is canceled by the capacitance cancellation circuit 28. However, the differential amplifier 38 makes use of smaller transistors in the differential transistor pair 58 and 60 that tend to have lower input capacitance as well as higher electrical noise. The electrical noise due to transistors 58 and 60, however, tends to be shunted by the relatively low impedance of the magnetic sensor 14 and therefore does not get coupled into the differential amplifier 16. Therefore, the differential amplifier 16 has the advantage of improved bandwidth due to the capacitance cancellation and low electrical noise due to the large transistor sizes in differential amplifier 16.

Although the present invention has been described with reference to preferred embodiments, workers skilled in the art will recognize that changes may be made in form and detail without departing from the spirit and scope of the invention.

What is claimed is:

1. A read differential amplifier system for producing a read output signal representative of changes in a magnetic read head, the read differential amplifier system comprising:
 a first differential amplifier circuit having first and second inputs for connection to the magnetic read head and first and second outputs for providing the read output signal representative of changes in the magnetic read head;
 a second differential amplifier circuit having first and second inputs connected respectively to the first and second inputs of the first differential amplifier circuit, the second differential amplifier having first and second outputs;
 a first feedback capacitance connected between the first input of the first differential amplifier circuit and the first output of the second differential amplifier circuit; and
 a second feedback capacitance connected between the second input of the first differential amplifier circuit and the second output of the second differential amplifier circuit.

2. The differential amplifier system of claim 1 wherein the first and second inputs of the first amplifier circuit have the same respective phase relationship as the first and second inputs of the second amplifier circuit and the first and second outputs of the second amplifier circuit.

3. The differential amplifier system of claim 1 wherein the first differential amplifier circuit has an input capacitance having substantially the same temperature coefficient as each of the first feedback capacitance and the second feedback capacitance.

4. The differential amplifier system of claim 1 wherein the first and second feedback capacitances comprise respective first and second capacitor-connected transistors.

5. The differential amplifier system of claim 1 wherein the second differential amplifier circuit has a gain value that is less than a gain value associated with the first differential amplifier circuit.

6. A read differential amplifier system for providing a read output signal representative of changes in a magnetic read head, the read differential amplifier system comprising:
 a first differential amplifier circuit having first and second inputs suited for connection to the magnetic read head and first and second outputs for providing the read output signal representative of changes in the magnetic read head, the first differential amplifier circuit having a first input capacitance associated with the first and second inputs; and
 a feedback amplifier circuit having first and second inputs and first and second outputs connected respectively to the first and second inputs of the first differential amplifier, the first and second outputs of the feedback amplifier circuit for outputting respective first and second feedback currents to the first and second inputs of the first differential amplifier to produce an effective input capacitance for the read differential amplifier system that is less than the first input capacitance.

7. The differential amplifier system of claim 6 wherein the first feedback current is substantially equal to an input current at the first input of the first differential amplifier.

8. The differential amplifier system of claim 6 wherein the second feedback current is substantially equal to an input current at the second input of the first differential amplifier.

9. The differential amplifier system of claim 6 wherein the feedback amplifier circuit includes a second differential amplifier circuit having first and second inputs connected respectively to the first and second inputs of the first differential amplifier and also having first and second outputs.

10. The differential amplifier system of claim 9 wherein the feedback amplifier circuit further includes:
 a first feedback capacitance connected between the first input of the first differential amplifier and the first output of the second differential amplifier; and
 a second feedback capacitance connected between the second input of the first differential amplifier and the second output of the second differential amplifier.

11. A read differential amplifier system for providing a read output signal representive of changes in a magnetic read head, the read differential amplifier system comprising:
 a first differential amplifier circuit having first and second inputs for connection to the magnetic read head and first and second outputs for providing the read output signal representative of changes in the magnetic read head; and
 a second differential amplifier circuit having first and second inputs connected respectively to the first and second inputs of the first differential amplifier and having first and second outputs connected respectively to the first and second inputs of the first differential amplifier, for providing respective first and second feedback currents based on changes in the magnetic read head to the first and second inputs of the first differential amplifier thereby reducing input capacitance of the read differential amplifier system, wherein the second differential amplifier includes a differential transistor pair having first and second control terminals connected respectively to the first and second inputs of the first differential amplifier.

12. The differential read amplifier system of claim 11 further including:

a first feedback capacitance connected between the first output of the second differential amplifier and the first input of the first differential amplifier; and a second feedback capacitance connected between the second output of the second differential amplifier and the second input of the first differential amplifier.

13. The differential read amplifier system of claim 11 further including:

a first feedback capacitance connected between the first output terminal of the second differential amplifier and the first input terminal of the first differential amplifier; and a second feedback capacitance connected between the second output terminal of the second differential amplifier and the second input terminal of the first differential amplifier.

\* \* \* \* \*